United States Patent
English (10) Patent No.: US 7,594,176 B1
(45) Date of Patent: Sep. 22, 2009

(54) AUTOMATED RETRIEVAL, EVALUATION, AND PRESENTATION OF CONTEXT-SENSITIVE USER SUPPORT

(75) Inventor: Paul English, Arlington, MA (US)

(73) Assignee: Intuit Inc., Mountain View, CA (US)

( * ) Notice: Subject to any disclaimer, the term of this patent is extended or adjusted under 35 U.S.C. 154(b) by 629 days.

(21) Appl. No.: 10/235,896

(22) Filed: Sep. 4, 2002

Related U.S. Application Data (60) Provisional application No. 60/317,552, filed on Sep. 5, 2001.

(51) Int. Cl.
*G06F 3/00* (2006.01)

(52) U.S. Cl. .............. 715/708; 715/705; 715/714; 715/234; 706/50

(58) Field of Classification Search ........... 715/705, 715/708, 714, 513; 706/50
See application file for complete search history.

(56) References Cited

U.S. PATENT DOCUMENTS

| | | | | |
|---|---|---|---|---|
| 5,388,251 A * | 2/1995 | Makino et al. | ............... | 714/57 |
| 5,581,684 A * | 12/1996 | Dudzik et al. | ............... | 715/708 |
| 5,754,938 A * | 5/1998 | Herz et al. | ............... | 725/116 |
| 5,835,918 A * | 11/1998 | Walls et al. | ............... | 715/513 |
| 5,911,043 A * | 6/1999 | Duffy et al. | ............... | 709/203 |
| 6,000,046 A * | 12/1999 | Passmore | ............... | 714/57 |
| 6,362,837 B1 * | 3/2002 | Ginn | ............... | 715/751 |
| 6,434,532 B2 * | 8/2002 | Goldband et al. | ............... | 705/7 |
| 6,577,755 B1 * | 6/2003 | Lorie | ............... | 382/140 |
| 6,594,799 B1 * | 7/2003 | Robertson et al. | ............... | 716/1 |
| 6,658,467 B1 * | 12/2003 | Rice et al. | ............... | 709/224 |
| 6,667,747 B1 * | 12/2003 | Spellman et al. | ............... | 715/714 |
| 6,721,736 B1 * | 4/2004 | Krug et al. | ............... | 707/5 |
| 6,842,877 B2 * | 1/2005 | Robarts et al. | ............... | 715/708 |
| 6,871,344 B2 * | 3/2005 | Grier et al. | ............... | 717/162 |
| 6,959,294 B2 * | 10/2005 | Sullivan et al. | ............... | 706/50 |
| 7,137,135 B2 * | 11/2006 | Schein et al. | ............... | 725/40 |
| 7,185,274 B1 * | 2/2007 | Rubin et al. | ............... | 715/513 |
| 2001/0047290 A1 * | 11/2001 | Petras et al. | ............... | 705/10 |
| 2002/0138471 A1 * | 9/2002 | Dutta et al. | ............... | 707/3 |
| 2002/0147757 A1 * | 10/2002 | Day et al. | ............... | 709/1 |
| 2008/0059882 A1 * | 3/2008 | McKirchy | ............... | 715/705 |

OTHER PUBLICATIONS

Lisa M. Covi, Mark S. Ackerman, "Such Easy-to-Use Systems! How Organizations Shape the Design and Use of Online Help Systems", Aug. 1995, ACM Press, Conference on Supporting Group Work, pp. 280-288.*

* cited by examiner

*Primary Examiner*—Tadesse Hailu
*Assistant Examiner*—Alvin H Tan
(74) *Attorney, Agent, or Firm*—Osha • Liang LLP (57) ABSTRACT

In response to an event occurring on a user's computer, a system, method, and user interface automatically determine the nature and context of the event, and search a database for support items, such as other users' comments, suggestions, or answers that are relevant to the event. Events can include, for example, errors, usage problems, or other difficulties with the software application, operating system, or hardware. Other resources, such as bulletin boards, discussion groups, websites, and the like, can also be automatically searched for support items using the parameters and context describing the event. The system and method select those support item or items that are most highly rated by other users as providing accurate, reliable, or otherwise useful information, and that appear to be the most relevant to the event. Also provided, in one embodiment, is a mechanism by which a user can evaluate a support item after he or she has read it.

30 Claims, 8 Drawing Sheets

AUTOMATED RETRIEVAL, EVALUATION, AND PRESENTATION OF CONTEXT-SENSITIVE USER SUPPORT

CROSS-REFERENCE TO RELATED APPLICATIONS

The present application claims priority from provisional U.S. Patent Application Ser. No. 60/317,552 for "Context-Sensitive User-Supported Database," filed Sep. 5, 2001, the disclosure of which is incorporated herein by reference.

BACKGROUND OF THE INVENTION

1. Field of the Invention

The present invention is related to context-sensitive help for software applications, and more particularly to automated retrieval, evaluation, and presentation of focused, context-sensitive support items that are relevant to a particular user problem, error message, or other event.

2. Description of the Background Art

Many software programs are complex and difficult to use. As computers and software become increasingly powerful, and as users demand more and more enhanced functionality, the need for providing effective and useful software product support grows. More powerful programs are often more difficult to learn and use, and tend to be more difficult to troubleshoot in case of problems. In addition, as computers become more ubiquitous in households and more essential to everyday life, the user base for software applications expands to include more and more users who are relatively unsophisticated in the use of computers. Thus, increasing numbers of users are using increasingly complex programs, and many of those users have relatively little basic knowledge about computers.

Figure 1A:
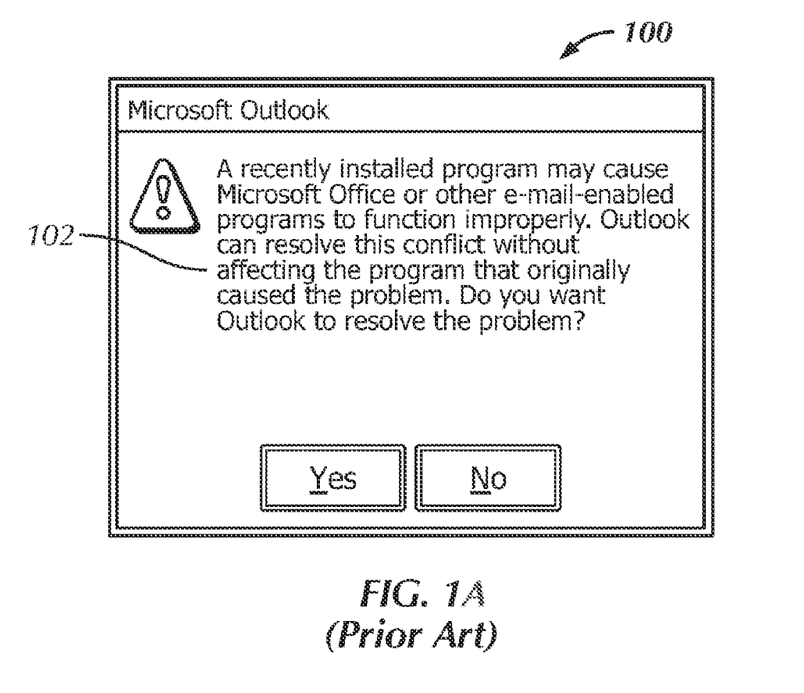
FIGS. 1A and 1B are screen shots depicting error message dialog boxes according to the prior art.
Figure 1B:
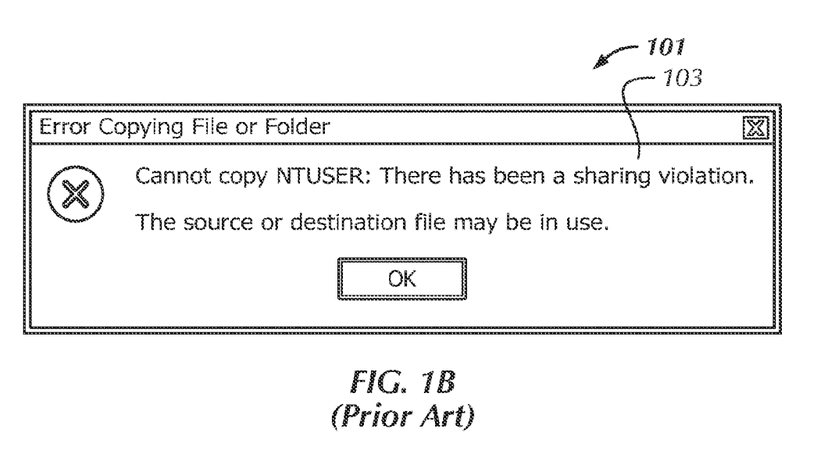

Many software programs present error messages in language that is difficult for ordinary users to understand. FIGS. 1A and 1B show examples of typical dialog boxes 100 and 101 according to the prior art, containing error messages 102 and 103 that are relatively cryptic and do not provide adequate descriptions, particularly for novice users.

When confronted with inscrutable error messages and dialog boxes, frustrated users often seek assistance by calling a customer service number. Providing such assistance is expensive, however; increasing labor costs have forced many software manufacturers to reduce the number of available live customer service representatives and/or to charge users for telephone support. Hold times increase as fewer representatives are available, and the quality of such support decreases as less skilled representatives are hired in order to save costs. As a consequence, live manufacturer support for programs has become less available, less convenient, and less useful.

Another difficulty with conventional mechanisms for providing software support is that the increased complexity of programs makes it more difficult for customer support representatives to be fully conversant with the company's software and to be able to provide all the answers. Increased complexity of programs and operating systems also makes it more difficult for manufacturers to adequately test and predict the software's performance in various environments.

Companies seek to save on support costs by providing other mechanisms for users to obtain assistance. Support websites may be established, frequently asked questions (FAQ) listings may be compiled, and other mechanisms may be put in place. Such measures are often inadequate, however, as they fail to provide a novice user with answers that take into account the particular context of the user's problem. In addition, such measures assume that the user is able to access the support resource and to effectively search for the relevant support item; such assumptions are often incorrect.

In response to this lack of adequate developer-provided customer support, some users turn to the World Wide Web, UseNet, bulletin boards, and other online resources. In particular, users may seek postings of other users who may have encountered similar problems or who have some level of expertise with respect to the software product. Since many applications have thousands or even millions of users, it is often the case that a particular user's problem has been encountered, and hopefully solved, by other users as well. Software applications that have a large user base thus have a large pool of collective knowledge distributed among their users. In many online environments including UseNet newsgroups, bulletin boards, news forums, personal websites, and the like, users informally share solutions and suggestions.

However, these information sources are highly distributed, and often difficult and inefficient to search, particularly for novice users. In order to be successful, such searches often require that the user know what to search for, where to search, and what key words describe the problem or situation to be resolved. Many users may not be sufficiently sophisticated to be able to conduct such searches. In addition, a user may not realize that the particular context in which the problem occurred is a relevant item of information, and may fail to include such context information in the search. Often, the application context is not even visible to the user, so that it is virtually impossible for the user to perform effective searches that take into account the context of the problem. Finally, novice users may not even be aware of the existence of online resources that may be effective in solving problems.

Even for those users that are able to perform effective searches, searching may be cumbersome and inefficient, particularly when there are many different potential sources and forums. Evaluating search results is time-consuming and difficult. Users must often read through many useless search results before finding a useful one. In general, many search engines return inconsistent and over-inclusive results, which are particularly difficult for the user to quickly evaluate for quality, accuracy, and reliability.

Some users may try posting a description of their problem in news forums and on online bulletin boards. Such a strategy requires that the user identify and locate a relevant user forum for the particular problem. The user must accurately and effectively describe the problem for others to read, including the context in which the problem occurred. The user must wait for someone with the requisite expertise to happen upon the posting and reply to the user's query. Once a reply is received, it is often difficult for the user to assess the quality, accuracy, and reliability of advice provided in such environments. In fact, in many cases such postings result in multiple different (and often inconsistent) suggestions, which the user may not be able to evaluate or resolve.

Given the increasingly complex nature of today's software, the increasingly complex operating environments, the growing user base of non-technical users, and the decreasing levels of live customer support from manufacturers, it would be valuable for users to be able to more easily tap into the vast pool of user knowledge that exists in a wide user base. What is needed is an automated approach that improves the ability of users to understand and resolve problems with software and computers by utilizing the diffuse knowledge of the user community. What is further needed is an approach that eliminates the need for the user to be able to describe their problem to others, to formulate and conduct searches, and to attempt to define the context in which a problem occurred. What is further needed is an approach that searches for solutions automatically on behalf of a user. What is further needed is an approach that provides a mechanism to identify quality solutions to problems.

SUMMARY OF THE INVENTION

The present invention automatically retrieves relevant support items, such as postings, comments, answers, articles, and the like, from stored databases, repositories or online resources. Retrieval is performed automatically in response to an event occurring on a user's computer; such events include, for example, errors, usage problems, or other difficulties with the software application, operating system, or hardware on the user's computer. The invention automatically determines the nature and context of the event, and searches a database for support items, such as other users' comments, suggestions, or answers that are relevant to the event. Other resources, such as bulletin boards, discussion groups, websites, and the like, can also be automatically searched for support items using the parameters and context describing the event. The invention selects the support item or items that are most highly rated by other users as providing accurate, reliable, or otherwise useful information, and that appear to be the most relevant to the event. The invention also provides, in one embodiment, a mechanism by which a user can evaluate a support item after he or she has read it.

In one embodiment, the invention displays the selected support item from within the application, so that the user need not exit the program to view the support item. In another embodiment, the invention provides to the user a link to the selected support item, allowing the user to access the support item by simply clicking on the link. More detailed information, or additional support items, may also be made available via links or other means. If desired, the user can rate the displayed support item, make comments, add his or her own support items, and/or provide other feedback. Such feedback may be used in selecting support items for display in connection with future events for this or other users. For example, highly rated support items may be selected for display more frequently than lower-rated support items; likewise, support items whose authors are generally associated with high ratings may be preferred over other support items.

In one embodiment, the mechanism of the present invention operates within the context of a software application but is independent of the application itself. It may be implemented, for example, as a plug-in for an application or as a program that remains in the background until needed, according to techniques that are known in the art. Accordingly, the invention can be implemented without the cooperation of the program developer, and enables independent support of virtually any software application. Alternatively, application developers can implement the functionality of the present invention as a bundled feature in a software application.

By providing a database and context sensitivity, the present invention eliminates the need for the user to describe the problem to others, to know the right search terms, to adequately describe the application context, or to search for and evaluate support items to assess their relevance. By incorporating user feedback and ratings of answers, the invention provides mechanisms for automatically assessing of the quality, reliability, and relevance of support items. Poorly rated support items are "weeded out" by being ignored.

The techniques of the present invention for implementing context-sensitive access to a database containing user-rated feedback can be extended beyond user support. For example, the invention can be used to trigger recommendations and offers for upgrades to the software application, competitive programs made by others, ancillary products (such as user guides, videos, other products), or unrelated products. The invention can further be used to trigger cross-marketing promotions of other services and products, or to provide a direct link to a live expert via chat or instant message (for example, via a hyperlink). In each case, the triggered action is sensitive to the context of the program in use, and where applicable the invention provides previously entered feedback, such as ratings and/or comments, for the triggered action.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF A PREFERRED EMBODIMENT

The following description of system components and operation is merely exemplary of one embodiment of the present invention.

System Architecture

Figure 2:
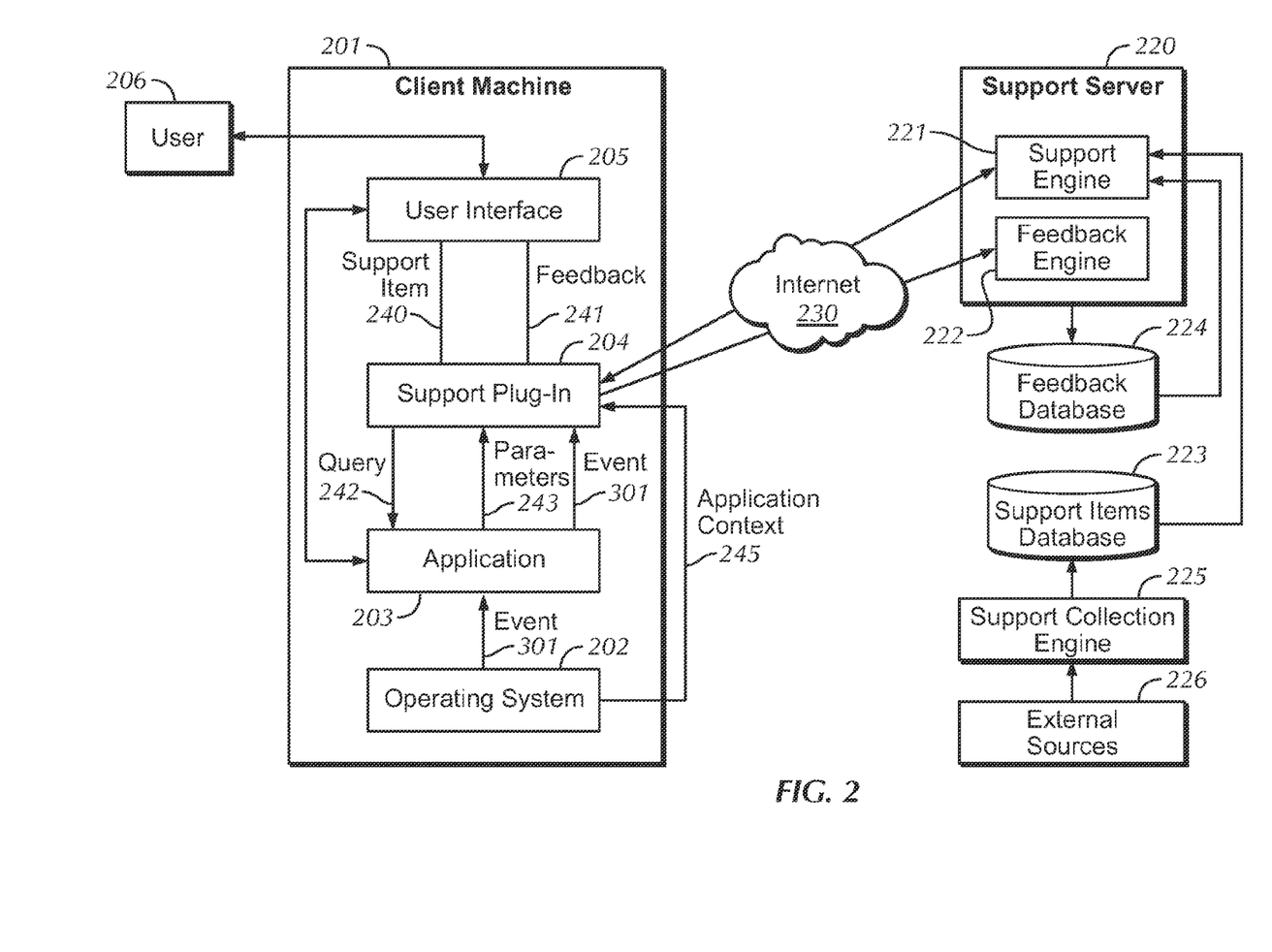
FIG. 2 is a block diagram depicting client and server components according to one embodiment of the present invention.

Referring now to FIG. 2, there is shown an example of a system for practicing the present invention according to one embodiment. In the example of FIG. 2, the invention is implemented in a client/server environment, as a mechanism for providing user 206 of client machine 201 with relevant, context-sensitive support items transmitted from support server 220. One skilled in the art will recognize that the invention can be implemented in other environments and according to other functional architectures, including non-client/server environments. For example, the invention can be implemented in a single computer or it can be implemented as a distributed software application across any number of connected computers.

FIG. 2 depicts user 206 interacting with client machine 201 via user interface 205. Client machine 201 can be implemented as any conventional, general purpose personal computer, and the various components 202, 203, 204, and 205 shown in FIG. 2 may be implemented as software that runs on machine 201 according to well known techniques.

Figure 5:
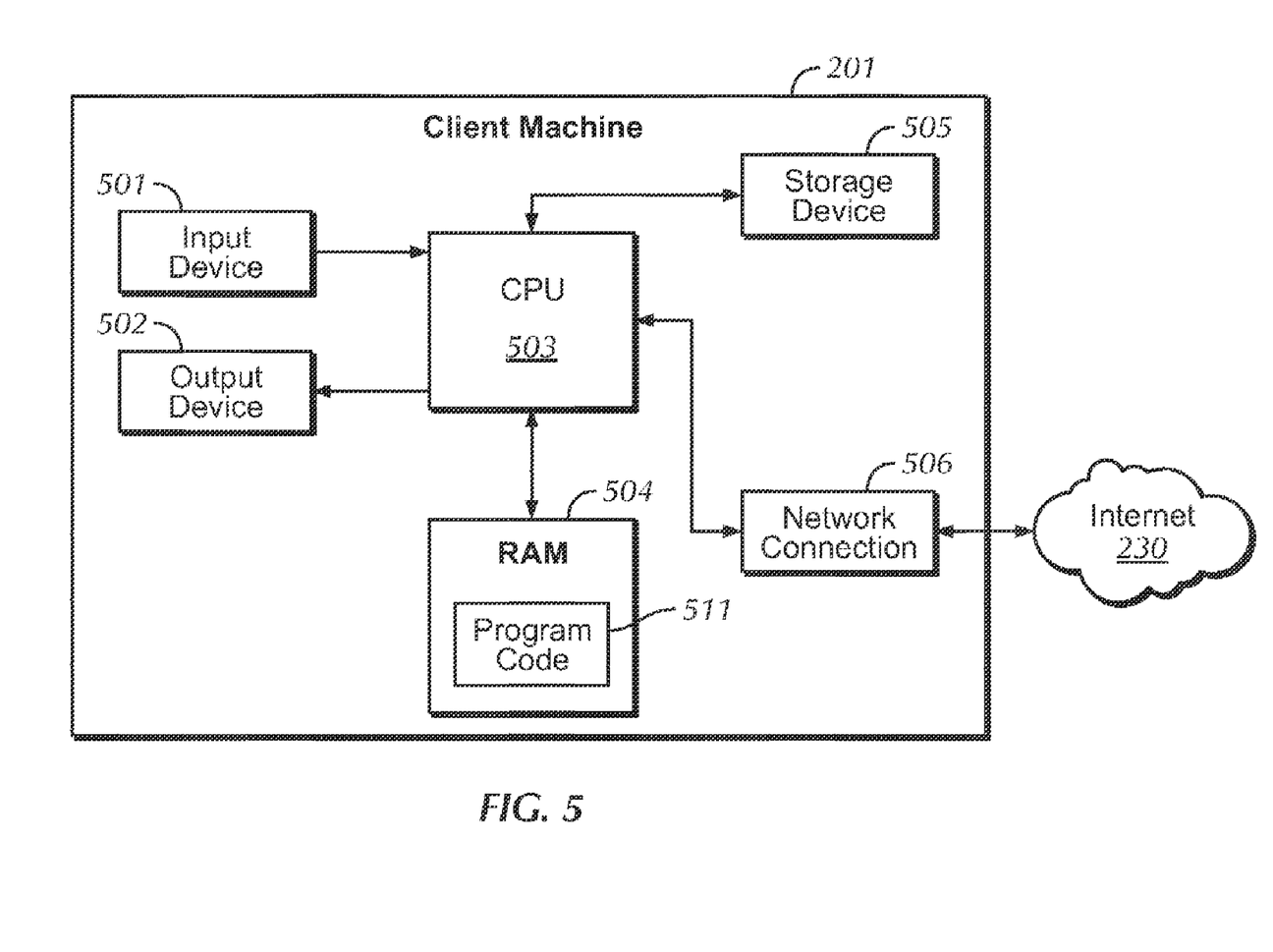
FIG. 5 is a block diagram depicting a client machine for running an automated context-sensitive user support system according to one embodiment of the present invention.

Referring also to FIG. 5, there is shown a block diagram depicting an example of an architecture for client machine 201. As shown in FIG. 5, client machine 201 may be a conventional computer such as a personal computer running an operating system such as Microsoft Windows XP, available from Microsoft Corporation of Redmond, Wash. Client machine 201 includes central processing unit 503 for performing operations and functions as specified in program code 511. Such functions include, for example, the functional elements 202 through 205 depicted in FIG. 2. Program code 511 may be stored in any storage medium, such as a hard drive, compact disc read-only memory (CD-ROM), and the like. While it is being executed, code 511 is temporarily read into random access memory (RAM) 504 so that it can easily be read and executed by CPU 503 according to techniques that are well known in the art.

Input device 501, such as a keyboard and/or mouse, allows the user to provide input for interacting with the functionality of the present invention. Output device 502, such as a display screen, displays output including that of the operating system, active applications, and the like. Such output typically includes dialog boxes and other status messages concerning the status of various operations running on machine 201. Machine 201 also includes network connection device 506, such as a modem, cable modem, Ethernet card, or the like, for connecting to a network such as the Internet 230, according to techniques that are well known in the art, so as to enable uploading, downloading, and interacting with network-connected resources.

Storage device 505, which may be implemented as a hard drive or other device, contains various files and resources for use by the software in performing the functions of the present invention.

One skilled in the art will recognize that FIG. 5 is merely exemplary, and that the invention can be practiced on systems having other configurations and components. For example, the functionality of the invention could be implemented in a network-based application such as may be provided by an application service provider (ASP); in such an embodiment, most of the functions described below as being performed by client machine 201 might be performed by a remotely located application server (not shown), according to techniques that are well known in the art.

Referring again to FIG. 2, client machine 201 includes several functional elements that are in one embodiment implemented as software code. Operating system 202, which may be any conventional operating system such as Microsoft XP or the like, is typically loaded from storage device 505 at startup and runs continuously on machine 201 to control operation, manage memory, manage applications, and the like. Machine 201 also runs one or more applications 203, which may include commercially available software packages such as Microsoft Word (available from Microsoft Corporation of Redmond, Wash.), Quicken (available from Intuit Inc. of Mountain View, Calif.), and the like, and/or may include shareware or other types of software.

In one embodiment, much of the functionality of the present invention is carried out by a software-implemented support plug-in 204 that executes on client machine 201. Plug-in 204 may be memory resident and independent of the main software application 203, or it may be an embedded feature within application 203. A single support plug-in 204 can support multiple different end user products. Alternatively, plug-in 204 may be omitted altogether, and the functionality described herein may be provided as part of an included feature in operating system 202 or application 203.

In one embodiment, plug-in 204 is implemented as software code that is automatically loaded into RAM 504 and that runs in the background but is essentially invisible to the user until an event occurs which causes plug-in 204 to become active. Plug-in 204 may be loaded when machine 201 first starts up, or upon launching of a particular application 203, or in response to a user command, or it can be launched only when called upon to perform a support item search. The support application can be invoked, for example, by the user via input device 501, which may include a keyboard, menu, or mouse's context menu, or by some other input technique. For example, the "Alt-F1" key combination may be employed to activate plug-in 204, since the F1 function key is typically the default key for an application's 203 own self-contained help system.

As will be described in more detail below in connection with FIGS. 3A through 3C, in one embodiment plug-in 204 operates to retrieve application context 245 at the time of invocation, transmit a query including application context 245 to support server 220, receive a response from server 220 with descriptions of support items, and generate and display (via user interface 205) a dialog box containing the support item(s) or a link to relevant item(s) in support items database 223 or some other resource. Plug-in 204 may also operate to prompt user 206 for feedback as to the quality and helpfulness of the displayed support item(s), and transmit user's 206 evaluation to feedback engine 222 on server 220.

User interface 205 presents output to user 206 and accepts user entry of commands and data. Although user interface 205 is shown in FIG. 2 as a single functional element, each of elements 202, 203, and 204 may contain their own user interface components which are active at various times and which work together to present output to and accept input from user 206. User interface 205 typically presents output via output device 502 such as a display screen, and accepts input via input device 501 such as a keyboard or mouse. User interface 205 typically includes standard components such as dialog boxes, scroll bars, buttons, fields, and the like, according to techniques that are well known in the art of software design.

Support server 220 contains various modules and engines for serving support items and feedback items to client machine 201 and other users' machines. Support server 220 is connected to or includes one or more support items databases 223 containing answers to problems, such as for example usability problems, error messages, and any other issues that are of interest to the user community of the software application. In one embodiment, database 223 is the back-end of a user forum or newsgroup (not shown) that is set up for the application, can support threaded discussions if desired, and can be pre-populated with known support answers to common problems. In another embodiment, database 223 contains support items that have been imported from such a user forum or newsgroup.

Support server 220 includes support engine 221 which acts as a web server interface that supports browser access to database 223 for adding questions, comments, answers, and replies. Feedback engine 222 acts as a web server interface for supporting browser access to feedback database 224. Feedback engine 222 can be implemented separately from support engine 221, or can be implemented as part of support engine 221. Server 220 provides caching, replication, security, and user account management according to techniques that are well known in the art.

As will be described in more detail below in connection with FIGS. 3A through 3C, in one embodiment server 220 operates to receive query strings from plug-in 204 in client machine 201, extract application context from received query strings, search support items database 223 using the extracted application context to find support answers, select the best-rated (or otherwise qualified) support answers, and return descriptions of the support answers to client 201, including (optionally) uniform resource locators (URLs) or other pointers linked to support answers in database 223 or in other resources. In one embodiment, a list of highest-rated best answers is provided to the client 201 in one operation, for display to the user (e.g. in a scrolling list). Feedback engine 222 receives user ratings of answers and updates answer ratings stored in database 224.

Support items database 223 contains a repository of support items such as messages, postings, websites, articles, and the like. Feedback database 224 contains evaluations of support items. In one embodiment, support items stored in database 223 are linked to associated feedback items in database 224 by pointers, handles, or by some other mechanism. In another embodiment, support items and feedback are stored in a single database. Databases 223 and 224 can be implemented using known database techniques, as are available in many commercial database applications. Databases 223 and 224 can be implemented as part of server 220, or as separate physical entities. They may be situated at the same physical location as server 220 or at remote locations. Server 220 may access databases 223 and 224 using any known local or remote database access methods. In an alternative embodiment, feedback database 224 may be omitted or combined with support items database 223.

In one embodiment, a support collection engine 225 is provided, for searching for and collecting relevant support items from external sources 226. For example, engine 225 may periodically search various UseNet groups or bulletin boards for postings that are relevant to a particular product. Items that are deemed to be of sufficient value may be imported into database 223, or they may be referenced by records in database 223, so that links to the items can be made available to users when appropriate. In one embodiment, engine 225 operates continually, so as to update database 223 when new items are available; in other embodiments, engine 225 operates periodically to gather and collect items for database 223. For example, engine 225 may be implemented as a "spider" application that continually crawls and parses web pages according to techniques that are known in art. Alternatively, engine 255 may be implemented using general agent technology or a Web Services interface that seeks out and interacts with tech support services. In yet another embodiment, tech support technicians may enter information directly, so that a support collection engine 225 is not required.

Users may also submit support items via their local machines, such as client machine 201. In one embodiment, another server (not shown) may be provided for receiving new support items and feedback items to be stored in databases 223 and 224; in other embodiments, support server 220 receives such items from users and stores them in databases 223 and 224.

In one embodiment, client machine 201 is connected via a network such as the Internet 230 to support server 220. Client machine 201 communicates with support server 220 according to standard Internet protocols and techniques including Transmission Control Protocol/Internet Protocol (TCP/IP) and Hypertext Transfer Protocol (HTTP). In one embodiment, support plug-in 204 generates and sends HTTP requests via the Internet 230 to support engine 221 and feedback engine 222, for requesting support items and feedback on support items.

Method of Operation

The operation of various components shown in FIG. 2 will be described in more detail below, in connection with the event trace diagrams depicted in FIGS. 3A, 3B, and 3C.

Figure 3A:
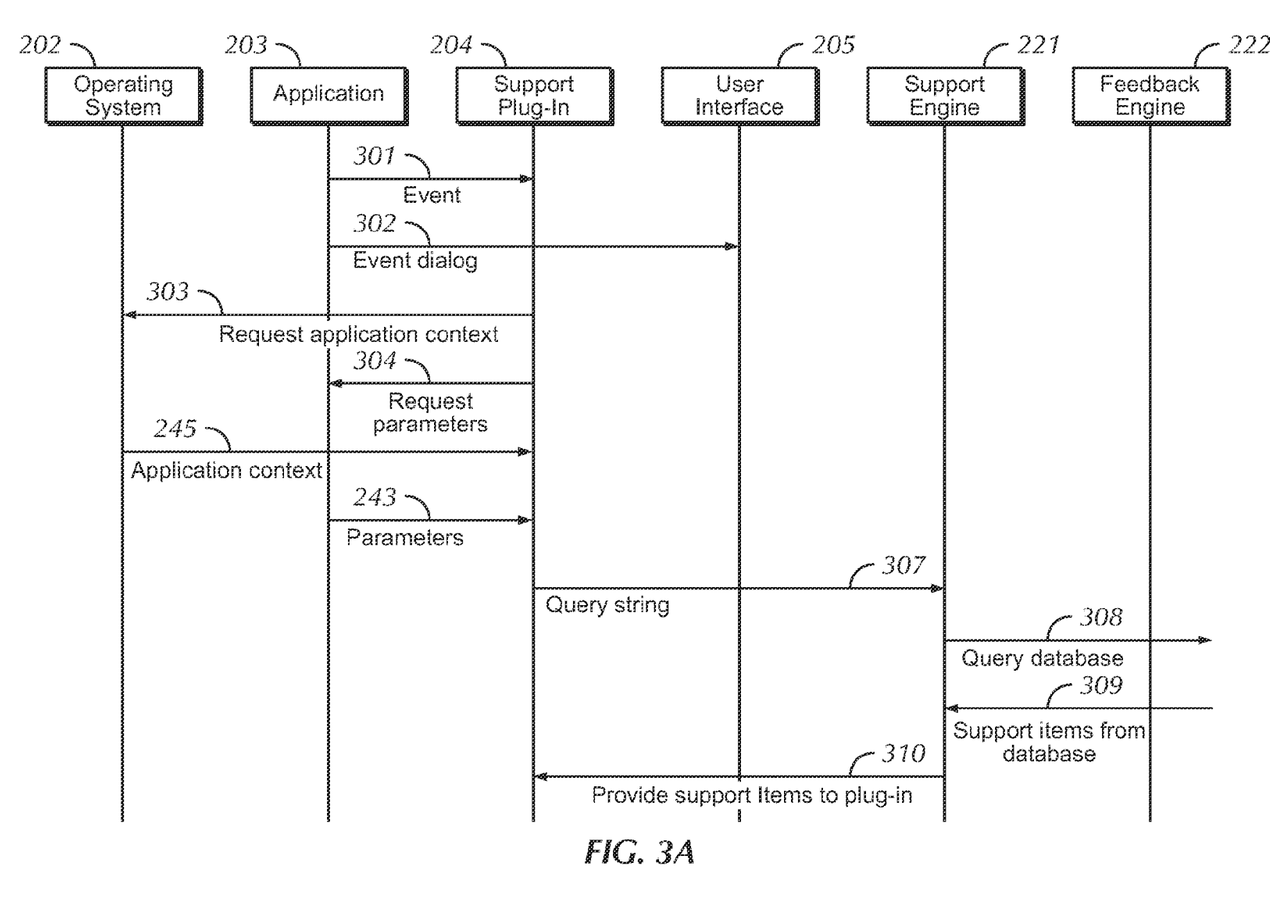
FIGS. 3A and 3B are an event trace diagram depicting a method of providing context-sensitive user support in response to an application event according to one embodiment of the present invention.
Figure 3B:
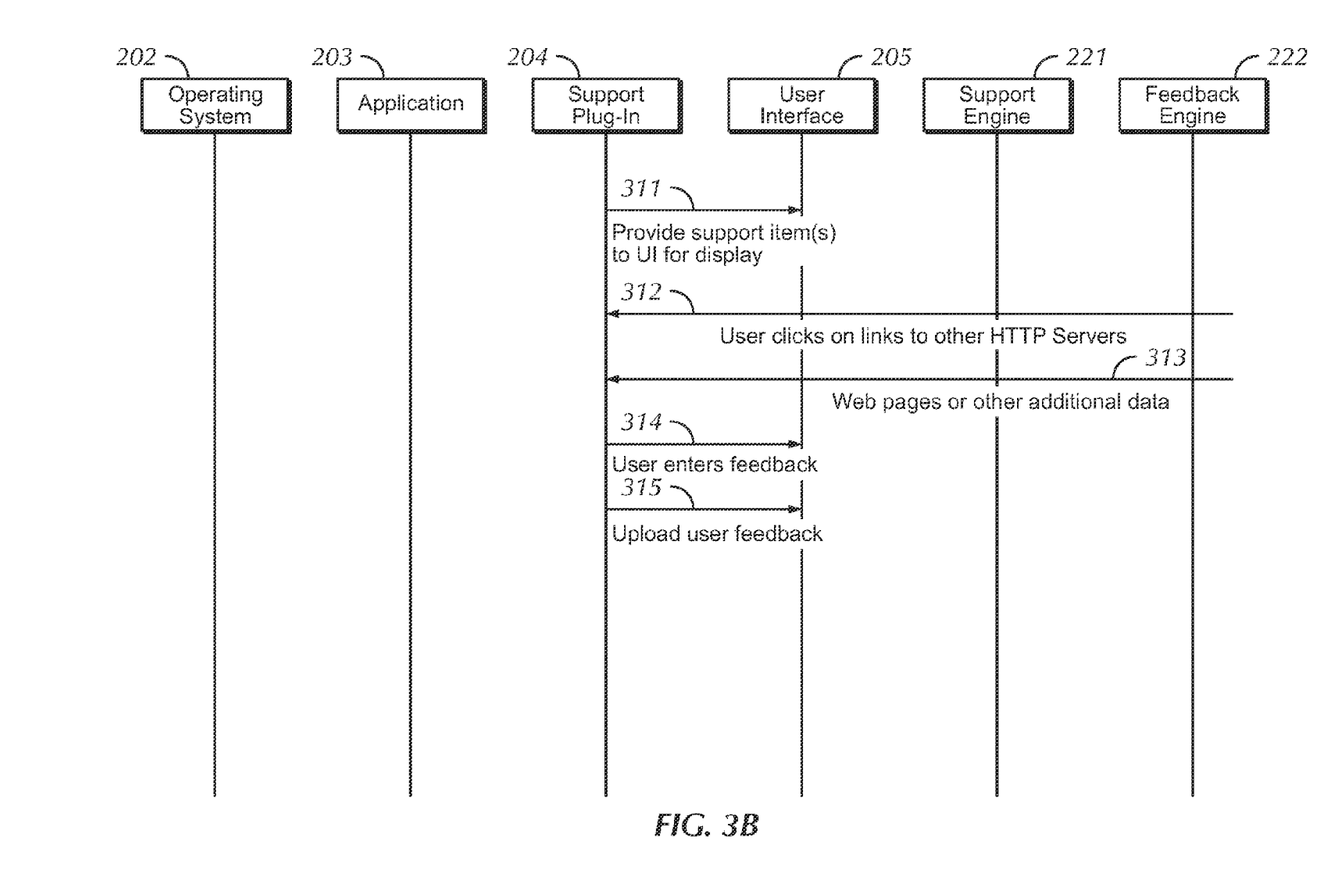

Referring now to FIGS. 3A and 3B, there is shown an event trace diagram depicting a method of providing context-sensitive user support in response to an application event according to one embodiment of the present invention. One skilled in the art will recognize that the diagram shows one example of a sequence of events for providing context-sensitive support according to the present invention, and that other sequences and operations could be provided without departing from the spirit or essential characteristics of the present invention. The events, or steps, described and depicted in FIGS. 3A and 3B and in the following discussion refer to the operation of the invention with respect to a single event occurring on a single client machine 201; however, the invention may operate concurrently with respect to any number of events and client machines 201, so that several users may simultaneously obtain context-sensitive support from one or more support servers 220 using the techniques of the present invention.

In FIG. 3A, application 203 communicates to plug-in 204 that an event 301 has taken place. Event 301 may be an error condition, exception, system status message, or other type of occurrence that warrants activation of the context-sensitive support system of the present invention. In general, such events 301 include occurrences that might cause a user to be confused or to seek out additional information in order to deal with or respond to a current problem. Communication between application 203 and plug-in 204 takes place using conventional message passing or other techniques for software components to communicate with one another.

In general, an event dialog box 302 or other status message presented by application 203 on user interface 205 accompanies event 301. Referring again to FIG. 1A, there is shown an example of an event dialog box 100 as may be displayed by an application 203 via user interface 205. In one embodiment, the display of event dialog box 100 is delayed until relevant context-sensitive feedback has been retrieved, so that such feedback can be displayed alongside and simultaneously with the display of event dialog box 100.

Upon receipt of the notification that event 301 has taken place, plug-in 204 requests 303 application context 245 from operating system 202, and further requests 304 any needed parameters from application 203. Operating system 202 and application 203 respond by providing application context 245 and parameters 243, respectively. Optionally, user 206 may be prompted to enter a question specific to the context, in the format of a question that might be sent to the user community and/or the software vendor. Plug-in 204 parses the entered question to extract relevant query terms and/or additional query parameters 243.

Application context 245 provides information describing the current state of client machine 201, including a description of which other programs are running, hardware and software characteristics, operating system description, and the like; such information may be useful in diagnosing the nature of the event and in searching for relevant support items. Parameters 243 include additional information describing the current state of application 203 that might not be visible to operating system 202 and is therefore supplied directly by application 203. One skilled in the art will recognize that items 303, 304, 245, and 243 are merely exemplary of the type of information plug-in 204 may request of operating system 202 and application 203, and that different types of information from different sources may be requested and received by plug-in 204 prior to obtaining context-sensitive support items. In an alternative embodiment, plug-in 204 may make no such requests and may proceed with obtaining context-sensitive support items without first determining an application context or parameters describing the current state of operating system 202 or application 203.

In one embodiment, plug-in 204 requests 303 application context using one or more of the following calls, as are available in the Microsoft Windows XP operating system:

GetForegroundWindow( ): get the topmost window handle;

GetWindowText( ): get the caption of the window given a window handle;

GetWindowThreadProcessId( ): get the process from the window handle;

GetModuleFileName( ): get path info given process handle;

GetStartupInfo(process id): get startup info for the process;

OpenProcess(process id): open an existing process object;

GetApplicationName( ): return the name of the current application; or

GetApplicationVersion( ): return current version number.

In one embodiment, operating system 202 provides application context 245 using a mechanism for encoding any desired type of information, including, for example:

Combining application name, module filename, and window caption;

Combining windows captions, module filename, and child window names within the parent window;

Combining application name, version and module name;

Hashing the module's binary image;

Hashing any of a number of string values; and

Tracking and sending recent events and/or commands used in the application.

Hashing the module's binary image may include, for example, a hash of the display characteristics of a captured screen, including display information, pixel information, colors, and the like. It may also include any or all of: settings or preferences information; translation of pixels into text via a type of optical character recognition (OCR); and/or other configuration data. In one embodiment, operating system 202 or plug-in 204 provides a mechanism for distinguishing content from user-specific display settings. Thus, the invention can distinguish, for example, between a user whose screen is set to large fonts and a user whose screen is set to small fonts; such a distinction may (or may not) be significant in diagnosing a particular problem.

Plug-in 204 formulates and transmits query string 307 to support engine 221. Query string 307 can take any form, but in one embodiment is a character string containing information describing event 301, application context 245, and parameters 243. Query string 307 may be transmitted, for example, as an HTTP GET request across Internet 230 to support server 220 containing engine 221. Query string 307 may be formatted using a "Parameter=Value" syntax as is well known in the art. Examples of such query strings 307 are "ProcessName=WINWORD.exe" or "WindowTitle=MyLetter.doc".

Support engine 221 receives query string 307 and extracts the application context (and parameters, if provided) from received query strings. Support engine 221 then queries 308 support items database 223 to search for support items relevant to the query. In one embodiment, support engine 221 queries 308 other databases which may be maintained by the same entity that maintains database 223, or which may be maintained by other entities and situated in different locations. In response to query 308, support engine 221 receives 309 support items from database 223 and/or from other sources. Support engine 221 may also receive feedback items related to received support items, so that it can evaluate the relative quality of the received items. Such feedback may include, for example, database records describing other users' evaluations of the support items, including ratings, quantitative and qualitative assessments of the support items' quality, ratings of the authors of the support items, and the like.

In one embodiment, prior to transmitting 310 support items to plug-in 204, support engine 221 uses the received feedback to evaluate the support items it has received in 309 and thereby assess their relevance and relative quality. Support engine 221 then transmits 310 descriptions of the support items to plug-in 204. In one embodiment, only those support items that are determined to be relevant and/or of sufficient quality are transmitted 310. In another embodiment, support engine 221 transmits the received feedback items to plug-in 204 as well, so that plug-in 204 (and/or the user 206 him- or herself) can make the quality assessment for retrieved support items.

In one embodiment, in 309 and 310, support items themselves are provided to support engine 221 and subsequently transmitted to plug-in 204. In another embodiment, links, URLs, or pointers to support items 309 are provided, so that plug-in 204 can then retrieve the items 309 by sending GET requests to the identified resources.

Referring now to FIG. 3B, there is shown a continuation of the event trace diagram of FIG. 3A. Once plug-in 204 has received the support items, plug-in 204 provides 311 the support items to user interface 205 for display to user 206. As described above, in one embodiment, prior to step 311, plug-in 204 evaluates the received items and selects the ones for display, so that only those support items that are of sufficient quality and relevancy are displayed.

In one embodiment, the user 206 is able to specify whether support engine 221 and/or plug-in 204 should select only those support items that meet a threshold quality level. Such options may be provided via a preferences screen, options dialog box, or the like. Consequently, if the user prefers to make such assessments him- or herself, the feedback items can be displayed for the user along with the support items themselves, so that the user can see the comments and evaluations provided by other users and thereby assess the quality of the support item being displayed.

In one embodiment, plug-in 204 directs user interface 205 to display the support item or items in a dialog box, as will be described in more detail below. The support item(s) may include hypertext links to other resources related to the problem. Such links may include, for example, links to a user support forum, web page, downloadable software patch, article, "mail-to", or the like. In response to user 206 clicking 312 on a supplied link, plug-in 204 retrieves 313 the specified resource and presents it to user 206 via user interface 205, according to well-known techniques. If appropriate, clicking 312 on a supplied link may launch another application, such as a browser, e-mail program, PDF reader, or file extractor, in order to access the specified resource. Such techniques of automatically launching applications based on the nature of the specified resource are well known in the art.

In one embodiment, the user is given an opportunity to provide feedback concerning the displayed support item(s). Feedback can be binary ("Thumbs Up"/"Thumbs Down"), scaled (for example, 1-10), qualitative, or of some other type. Input fields, radio buttons, pulldown menus, checkboxes, and the like may be provided for entry of ratings, comments, "yes/no" responses to particular questions, and the like. The user enters 314 feedback via user interface 205.

Plug-in 204 uploads 315 the user's feedback to feedback engine 222. Based on received feedback, feedback engine 222, which may be implemented as part of support server 220 or support engine 221, or as a separate entity, updates stored ratings in database 224 using appropriate algorithms (for example, the total Thumbs Up ratings, or a moving average of scaled ratings, or the like). In one embodiment, ratings are decayed over time, so that more recent ratings are weighted more heavily in determining averages. The decay can be made slower for highly rated answers, and faster for lower rated answers. Aggregated feedback records are stored in database 224 for future use.

Figure 3C:
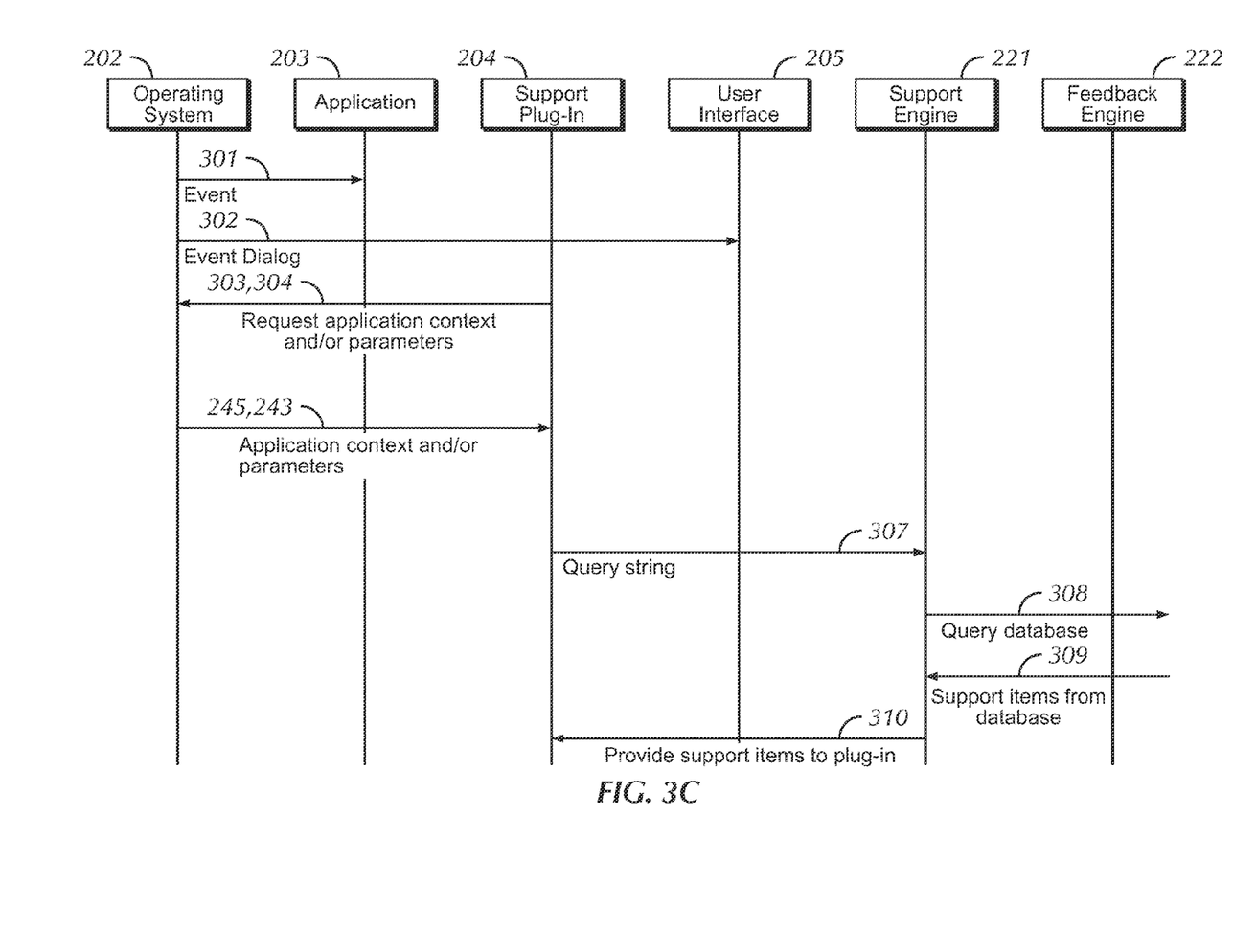
FIG. 3C is an event trace diagram depicting a portion of a method of providing context-sensitive user support in response to an operating system event according to one embodiment of the present invention.

Referring now to FIG. 3C, there is shown an event trace diagram depicting a method of providing context-sensitive user support in response to an operating system event according to one embodiment of the present invention. One skilled in the art will recognize that the diagram shows one example of a sequence of events for providing context-sensitive support according to the present invention, and that other sequences and operations could be provided without departing from the spirit or essential characteristics of the present invention. The events, or steps, described and depicted in FIG. 3C and in the following discussion refer to the operation of the invention with respect to a single event occurring on a single client machine 201; however, the invention may operate concurrently with respect to any number of events and client machines 201, so that several users may simultaneously obtain context-sensitive support from one or more support servers 220 using the techniques of the present invention.

In FIG. 3C, operating system 202 communicates to application 203 that an event 301 has taken place. Event 301 may be an error condition or other type of occurrence that warrants activation of the context-sensitive support system of the present invention. In general, such events 301 include occurrences that might cause a user to be confused or to seek out additional information in order to deal with or respond to a current problem. Operating system 202 may also transmit an indication of occurrence of event 301 to support plug-in 204, or alternatively application 203 may relay such information to plug-in 204. Communication among operating system 202, application 203, and plug-in 204 takes place using conventional message passing or other techniques for software components to communicate with one another.

In general, an event dialog box 302 or other status message presented by operating system 202 on user interface 205 accompanies event 301.

Upon receipt of the notification that event 301 has taken place, plug-in 204 requests application context 303 and/or any needed parameters 304 from operating system 202. Operating system 202 responds by providing application context 245 and parameters 243. The application context provides information describing the current state of client machine 201, including a description of which other programs are running, hardware and software characteristics, operating system description, and the like; such information may be useful in diagnosing the nature of the event and in searching for relevant support items. Parameters include additional information describing the current state of operating system 202. One skilled in the art will recognize that application context and parameters are merely exemplary of the type of information plug-in 204 may request of operating system 202, and that different types of information from different sources may be requested and received by plug-in 204 prior to obtaining context-sensitive support items. In an alternative embodiment, plug-in 204 may make no such requests and may proceed with obtaining context-sensitive support items without first determining an application context or parameters describing the current state of operating system 202.

Steps 307 to 310 of FIG. 3C are substantially identical to steps 307 to 310 as described above in connection with FIG. 3A. Upon completion of step 310, the system proceeds with steps 311 through 315 as described above in connection with FIG. 3B.

User Interface

Figure 4:
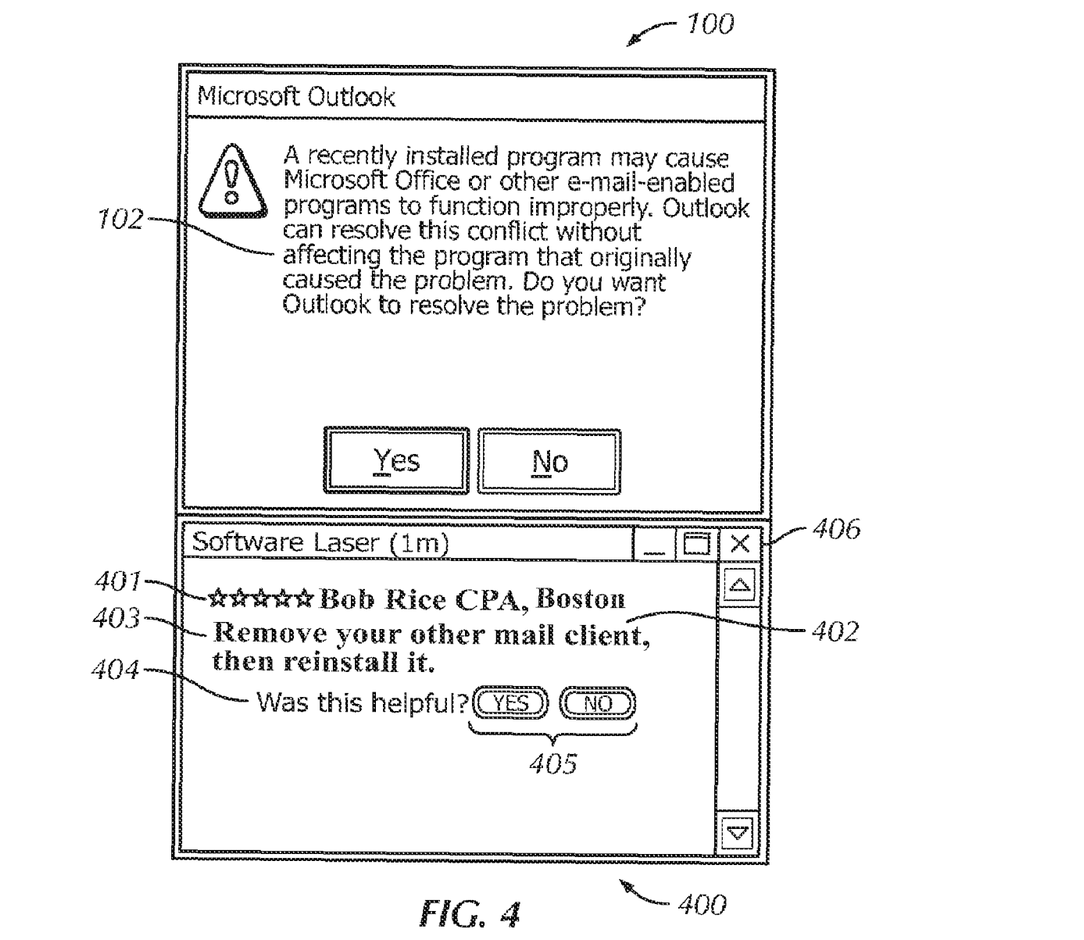
FIG. 4 is a screen shot depicting a context-sensitive user support item as displayed adjacent to an error message dialog box, according to one embodiment of the present invention.

Referring now to FIG. 4, there is shown an example of a user interface for the present invention. FIG. 4 depicts a screen shot as might be presented after the support plug-in 204 has been activated or invoked in response to an application event or operating system event and a support item has been received from server 220. Dialog box 400 contains a support item.

In this example, dialog box 400 generated by support plug-in 204 is displayed concurrently with original dialog box 100 containing error message 102 presented by application 203. Thus, the additional information provided by the present invention is presented to the user alongside presentation of the original error message, so that the user can immediately see advice, comments, and links to additional resources concerning the current problem. In one embodiment, dialog box 400 is presented in a different color and/or style than other dialog boxes in user interface 205, and/or is labeled to indicate that its source is the user support plug-in, so as to clarify for the user that dialog box 400 does not come from application 203 itself. A disclaimer may be provided, to indicate that the advice or suggestions shown in dialog box 400 do not necessarily come from the manufacturer of operating system 202 or application 203, but are derived from information received from third parties.

Dialog box 400 includes a textual description 403 of a suggested solution to the user's problem. This may be derived, for example, from a bulletin board posting describing a solution to a problem similar to that encountered by the user. In one embodiment, dialog box 400 includes an identifier 402 of the source of the answer (in this case, Bob Rice), which may be underlined to signify that it is a hyperlink to more detailed information or to a means for contacting the person. The particular information describing an author may depend upon the type of information that is available from support items database 223 and/or the nature of the support item. Rating 401 indicates a summary of other users' evaluations of either the support item or the author of the support item. Rating 401 may be aggregated by plug-in 204 or feedback engine 222 based on a number of feedback records in database 224. In one embodiment, a rating hyperlink may be provided (not shown), to allow the user 206 to obtain more detailed evaluations of the support item by clicking on the link.

A feedback question 404 is provided, along with buttons 405 for responding to the question. One skilled in the art will recognize that more elaborate feedback questions, fields, buttons, and menus may be provided, or a link to a more detailed feedback questionnaire may be included in dialog box 400. The user may be given an incentive to provide feedback, such as access to a premium level of the context-sensitive feedback service, or free or reduced-rate software upgrades, or the like. Close box 406 dismisses dialog box 400. In one embodiment, dialog box 400 is automatically dismissed when user 206 dismisses dialog box 100, in other embodiments, user 206 is prompted to determine whether he or she wishes to dismiss dialog box 400 when dialog box 100 is dismissed. In yet another embodiment, dialog box 400 is dismissed when user 206 provides feedback by clicking on one of buttons 405.

One skilled in the art will recognize that the appearance of dialog box 400 is merely one example of a presentation of support item 403 and related information. In other embodiments, such information may be presented in a different manner, including for example other formats of dialog boxes, pop-up items, icons, and the like. In addition, the particular format, layout, and presentation of support items 403 and related information may be configurable by user 206, for example via a "preferences" or "options" screen. User 206 may also specify, in one embodiment, whether support items 403 are automatically displayed for all applicable events, or whether some user action is required to activate the display of support items 403, or whether some other condition must be satisfied before support items 403 are displayed. In this manner, the present invention is able to present context-sensitive support items that are useful to user 206 without being excessively disruptive or distracting.

The present invention provides a mechanism for leveraging a wide base of knowledge available in application support—namely, the community of users, which typically includes many expert users. For example, useful data from 500,000 users might be available via the present invention, as compared with a typically lower number of customer service representatives ranging from, for example, 10 for an internal help desk to 100-1000 for a vendor support organization.

By providing for feedback such as community ratings, the present invention provides a mechanism for maintaining the quality of answers.

The desktop client invocation schemes of the present invention ensure that help is at the user's fingertips. The automatic determination of application context eliminates user data entry and the need for guessing at the appropriate way to describe the problem. Assistance provided by the present invention is therefore very context-sensitive, focused, and relevant to the user's problem.

The invention also provides advantages for application developers. It leads to better overall customer experience, and saves money by reducing the cost of providing customer support. In addition, the invention can be implemented to establish an independent revenue stream, by for example offering a subscription-level service.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or, other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer, network of computers, or other apparatus. Various general-purpose systems may be used with programs in accordance with the teachings herein, or it may prove convenient to construct more specialized apparatus to perform the required method steps. The required structure for a variety of these systems appears from the description. In addition, the present invention is not described with reference to any particular programming language. It will be appreciated that a variety of programming languages may be used to implement the teachings of the invention as described herein.

As will be understood by those familiar with the art, the invention may be embodied in other specific forms without departing from the spirit or essential characteristics thereof. For example, the particular architectures depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. In addition, the present invention may be implemented as a method, process, user interface, computer program product, system, apparatus, or any combination thereof. Accordingly, the disclosure of the present invention is intended to be illustrative, but not limiting, of the scope of the invention, which is set forth in the following claims.

What is claimed is:

1. In a client/server environment, a method for providing focused context-sensitive user support, comprising:
    receiving, at a server, a query from a remotely located client, the query indicating that an error event has occurred at the remotely located client;
    extracting from the query an application context for the remotely located client;
    retrieving a support item responsive to the query and relevant to the application context;
    receiving a first feedback item for evaluating the support item, wherein the first feedback item exists prior to the error event;
    transmitting, to the remotely located client, at least one selected from a group consisting of the support item and a link to the support item;
    receiving, from the remotely located client, a second feedback item based on a user evaluation of the support item in resolving the error event; and
    updating the first feedback item based on the second feedback item.

2. The method of claim 1, wherein the support item comprises at least one selected from a group consisting of a posting, an article, an e-mail message, a newsgroup thread, an offer for a product, and an offer for an upgrade.

3. The method of claim 1, wherein the application context is obtained using an operating system call.

4. The method of claim 1, wherein the application context comprises at least one selected from a group consisting of a hashing of a captured screen and a translation of pixels into text using optical character recognition (OCR).

5. The method of claim 1, wherein the first feedback item is at least one selected from a group consisting of an evaluation of the support item, a user evaluation of the support item, an estimate of the relevancy of the support item with respect to the received query, a number of times the support item has previously been retrieved, a qualitative assessment of the support item, and a rating of an author of the support item.

6. The method of claim 1, wherein the second feedback item is at least one selected from a group consisting of a binary value, a scaled value, and a qualitative assessment of the support item.

7. The method of claim 1, further comprising:
    transmitting, to the remotely located client, the first feedback item prior to receiving, from the remotely located client, the second feedback item; and
    evaluating, at the remotely located client, the support item based on the first feedback item.

8. The method of claim 1, wherein the first feedback item decays over time.

9. The method of claim 1, wherein the remotely located client is operated by a first user and the first feedback item is generated by a second user.

10. In a client/server environment, a method for providing focused context-sensitive user support, comprising:
    responsive to an error event, retrieving an application context, and transmitting a query and the application context from a client to a remotely located server;
    receiving, from the remotely located server, a representation of a support item responsive to the query and relevant to the application context, wherein the support item is associated with a first feedback item for evaluating the support item, and wherein the first feedback item exists prior to the error event;
    displaying the support item;
    transmitting a second feedback item based on a user evaluation of the support item in resolving the error event; and
    updating the first feedback item based on the second feedback item.

11. The method of claim 10, wherein the support item comprises at least one selected from a group consisting of a posting, an article, an e-mail message, a newsgroup thread, an offer for a product, and an offer for an upgrade.

12. The method of claim 10, wherein the application context is obtained using an operating system call.

13. The method of claim 10, wherein the first feedback item is at least one selected from a group consisting of an evaluation of the support item, a user evaluation of the support item, an estimate of the relevancy of the support item with respect to the received query, a number of times the support item has previously been retrieved, a qualitative assessment of the support item, and a rating of an author of the support item.

14. The method of claim 10, wherein the second feedback item is at least one selected from a group consisting of a binary value, a scaled value, and a qualitative assessment of the support item.

15. The method of claim 10, further comprising evaluating, at the remotely located client, the support item based on the first feedback item.

16. The method of claim 10, wherein the first feedback item decays over time.

17. In a client/server environment, a server system for providing focused context-sensitive user support, comprising:
    a query processing module for receiving a query from a remotely located client, the query indicating that an error event has occurred at the remotely located client;
    a support items database, for storing a plurality of support items;
    a support engine, coupled to the query processing module and to the support items database, for:
        extracting from the query an application context for the remotely located client;
        retrieving, from the support items database, a support item responsive to the query and relevant to the application context;
        receiving a first feedback item for evaluating the support item, wherein the first feedback item exists prior to the error event;
        transmitting, to the remotely located client, at least one selected from a group consisting of the support item and a link to the support item; and
    a feedback engine, for receiving, from the remotely located client, a second feedback item based on a user evaluation of the support item in resolving the error event, and updating the first feedback item based on the second feedback item.

18. The system of claim 17, wherein the support item comprises at least one selected from a group consisting of a posting, an article, an e-mail message, a newsgroup thread, an offer for a product, and an offer for an upgrade.

19. The system of claim 17, wherein the application context is obtained using an operating system call.

20. The system of claim 17, wherein the first feedback item decays over time.

21. The system of claim 17, wherein the support engine is configured to operate as a spider application to update the support item database.

22. The system of claim 17, further comprising:
    a feedback database, coupled to the feedback engine and to the support engine, for storing the first feedback item.

23. In a client/server environment, a method for providing focused context-sensitive user support, comprising:

receiving, at a server, a query from a remotely located client, the query indicating that a user help invocation has occurred at the remotely located client;

extracting from the query an application context for the remotely located client;

retrieving a support item responsive to the query and relevant to the application context;

receiving a first feedback item for evaluating the support item, wherein the first feedback item exists prior to the user help invocation;

transmitting, to the remotely located client, at least one selected from a group consisting of the support item and a link to the support item;

receiving, from the remotely located client, a second feedback item based on a user evaluation of the support item in providing user support; and updating the first feedback item based on the second feedback item.

24. The method of claim 23, wherein the first feedback item is at least one selected from a group consisting of an evaluation of the support item, a user evaluation of the support item, an estimate of the relevancy of the support item with respect to the received query, a number of times the support item has previously been retrieved, a qualitative assessment of the support item, and a rating of an author of the support item.

25. The method of claim 23, wherein the second feedback item is at least one selected from a group consisting of a binary value, a scaled value, and a qualitative assessment of the support item.

26. The method of claim 23, further comprising:

transmitting, to the remotely located client, the first feedback item prior to receiving, from the remotely located client, the second feedback item; and evaluating, at the remotely located client, the support item based on the first feedback item.

27. In a client/server environment, a method for providing focused context-sensitive user support, comprising:

responsive to a user help invocation, retrieving an application context, and transmitting a query and the application context from a client to a remotely located server;

receiving, from the remotely located server, a representation of a support item responsive to the query and relevant to the application context, wherein the support item is associated with a first feedback item for evaluating the support item, and wherein the first feedback item exists prior to the user help invocation;

displaying the support item;

transmitting a second feedback item based on a user evaluation of the support item in providing user support; and updating the first feedback item based on the second feedback item.

28. The method of claim 27, further comprising evaluating, at the remotely located client, the support item based on the first feedback item.

29. A computer readable medium storing instructions to provide focused context-sensitive user support in a client/server environment the instructions comprising functionality to:

receive, at a server, a query from a remotely located client the query indicating that an error event has occurred at the remotely located client;

extract from the query an application context for the remotely located client;

retrieve a support item responsive to the query and relevant to the application context;

receive a first feedback item for evaluating the support item, wherein the first feedback item exists prior to the error event;

transmit, to the remotely located client, at least one selected from a group consisting of the support item and a link to the support item;

receive, from the remotely located client, a second feedback item based on a user evaluation of the support item in resolving the error event; and update the first feedback item based on the second feedback item.

30. A computer readable medium storing instructions to provide focused context-sensitive user support in a client/server environment, the instructions comprising functionality to:

retrieve an application context in response to an error event, and transmit a query and the application context from a client to a remotely located server;

receive, from the remotely located server, a representation of a support item responsive to the query and relevant to the application context, wherein the support item is associated with a first feedback item for evaluating the support item, and wherein the first feedback item exists prior to the error event;

display the support item;

transmit a second feedback item based on a user evaluation of the support item in resolving the error event; and update the first feedback item based on the second feedback item.

* * * * *